Nov. 14, 1961   T. F. CARMICHAEL   3,009,092
GENERATOR SYSTEM

Filed July 29, 1959   4 Sheets-Sheet 1

INVENTOR.
Thomas F. Carmichael
BY
Harness, Dickey & Pierce
ATTORNEYS

Nov. 14, 1961 T. F. CARMICHAEL 3,009,092
GENERATOR SYSTEM
Filed July 29, 1959 4 Sheets-Sheet 3

INVENTOR.
Thomas F. Carmichael.
BY
Harness, Dickey & Pierce
ATTORNEYS.

INVENTOR.
Thomas F. Carmichael
BY
Harness, Dickey & Pierce
ATTORNEYS.

United States Patent Office 3,009,092
Patented Nov. 14, 1961

3,009,092
GENERATOR SYSTEM
Thomas F. Carmichael, Plymouth, Mich., assignor to Syncro Corporation, Oxford, Mich., a corporation of Michigan
Filed July 29, 1959, Ser. No. 830,432
33 Claims. (Cl. 322—58)

This application is a continuation-in-part of my application Serial No. 539,743, filed October 11, 1955, of my application Serial No. 589,216, filed June 4, 1956, both now abandoned, and of my application Serial No. 628,439, filed December 14, 1956, now abandoned.

This invention relates to permanent-magnet field electric generators.

While the principles of the invention are broadly applicable to a variety of types of generators, they are herein representatively embodied in a compact, lightweight structure adapted to supply relatively low power magnitudes in a portable or semi-portable system.

More particularly, the principles of the invention are exemplarily applied to an alternator designed to be driven by a gasoline engine and to provide electric power for lighting, for energizing auxiliary electro-responsive apparatus, for charging storage batteries, etc. In its disclosed form, the structure is also adapted to function as a flywheel magneto to supply ignition current for the engine.

In systems of this type, it has been difficult to generate adequate auxiliary electric power without employing inordinately large or heavy structures and without the cost of the unit being disproportionate to its utility. The customary mode of providing additional power has been to increase the size, weight and/or expense of some or all of the constituent elements, the speed of rotation of the generator normally being controlled by consideration other than that of auxiliary power output.

Further, the rotational speed of gasoline engines used as motive power for boats, bicycles, lawn mowers, etc., tends to vary over a substantial range either with throttle settings, loads, or both. Consequently, the output of a generator driven directly by such an engine will similarly vary over substantial ranges. If the generator be designed to provide an output appropriate to a preselected lighting load, for example, at a selected nominal running speed, insufficient power will be developed at slower engine speeds to maintain full illumination from the lamps or full energization of any other load device, while at higher engine speeds, the generator output may well rise to such a value as to burn out the lamps or damage the other load devices.

By practicing the principles of the present invention, substantially increased power output can be obtained without a commensurate increase in size, weight or cost relative to conventional generators of the noted type. Additionally, improved regulation may be achieved, so that the output of the generator remains substantially constant at any driven speed in excess of a selected speed, or may, in fact, decrease with increases in engine speeds above a preselected speed.

The nature of the invention may be more fully understood from the following detailed description of embodiments of the invention when read with reference to the accompanying drawings in which.

Figure 1:
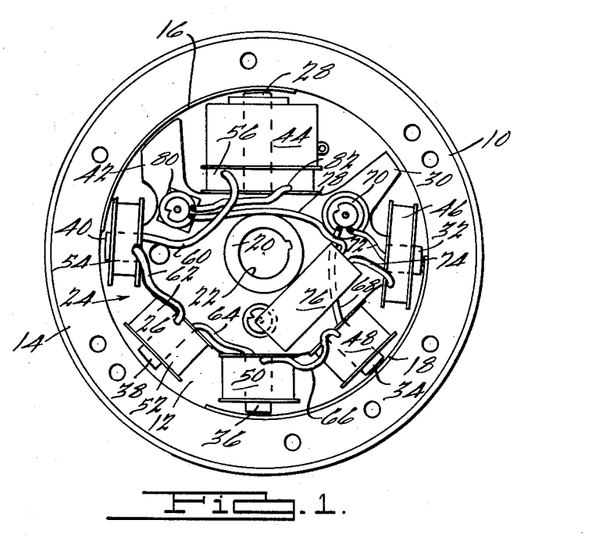
FIGURE 1 is a plan view of the underside of a generator assembly embodying the principles of the present invention.

Referring first to FIG. 1 of the drawings, the field structure 10 is or may be conventional in form and is herein represented as being adapted to also serve the function of a flywheel on a gasoline engine. Structure 10 comprises a generally cup-shaped member having a disk-like base 12 portion and a massive annular flange 14. One or more permanent magnets such as 16 and 18 are secured to or embedded in the inner surface of the flange portion 14, these magnets being arcuate in form and concentric with the flange 14. While one permanent magnet, such as magnet 16, will suffice in many applications, the magnitude of the output of the generator is very substantially increased by the provision of a pair of magnets, as shown. It will be appreciated that other types of field structure may be employed without departing from the inventive principles herein presented. The base 12 is provided at its center with a stepped, centrally apertured, raised portion 20 defining a keyed bore 22 by means of which the field structure 10 is associated with and rotated by a shaft (not shown) of the associated engine.

A core and coil structure 24 is disposed within the cup-shaped member 10 and is so supported (by means not shown) that the member 10 may rotate with respect thereto. The core 26 is preferably a laminated structure formed of appropriate magnet steel and comprises a centrally apertured generally annular portion having a plurality of legs 28-42 extending generally radially therefrom. Legs 28-42 may be evenly spaced around the periphery of the annular portion of the core 26, that is, at approximately forty-five degree intervals with the representative eight legs provided, or the interleg spacing may be varied, such as shown, to suit the requirements imposed upon any given structure. It is desirable that the tips of the legs 28-42 closely approach, but not engage, the arcuate permanent magnets 16 and 18, and, to this end, the outermost ends of the legs 28-42 are desirably themselves arcuate.

It is assumed in the representative embodiment of the invention that the structure is to serve not only as a generator of power for auxiliary equipment but also as a magneto to provide ignition current. Consequently, a magneto coil unit 44 is mounted upon leg 28, the output leads from coil unit 44 not being shown. The magnetic circuit for the magneto includes a portion of the annular portion of the core 26, and legs 28, 30 and 42.

The auxiliary power generating function is accomplished by means including coils 46, 48, 50, 52, 54 and 56 mounted upon legs 32, 34, 36, 38, 40 and 28, respectively. The number of turns and the wire size in these several coils is determined by the output voltage and current requirements, as well as by the space available for the windings. With the particular core structure disclosed, it is feasible to place a coil 56 upon leg 28 adjacent the magneto coil unit 44, but no coils are placed upon legs 30 and 42. It has been found that neither the presence of coil 56 upon leg 28 nor the provision of any of the other coils adversely affects the operation of the ignition-current system including magneto coil unit 44.

In the exemplary arrangement, each of the coils 46–56 comprises a single winding terminating in two terminal leads. One terminal lead of coil 56 is connected to one terminal lead of coil 54 by a conductor 60, the other terminal lead of coil 54 is connected to one terminal lead of coil 52 by a conductor 62, the other terminal lead of coil 52 is connected to one terminal lead of coil 50 by a conductor 64, the other terminal lead of coil 50 is connected to one terminal lead of coil 48 by a conductor 66, and the other terminal lead of coil 48 is connected by a conductor 68 to a terminal 70 which is insulated from the core structure. Terminal 70 may also serve as a rivet to hold the core laminations together if proper insulation is provided. One terminal lead of coil 46 is also connected to terminal 70 by a conductor 72, and the other terminal lead of coil 46 is connected by conductor 74 to one terminal of capacitor 76, with the other terminal of that capacitor being connected by conductor 78 to terminal 80 which is also insulated from the core structure and may serve as a rivet to interjoin the laminations. Conductor 82 interconnects terminal 80 with the other terminal lead of coil 56. The output of the generator may be taken between terminals 70 and 80.

Figure 2:
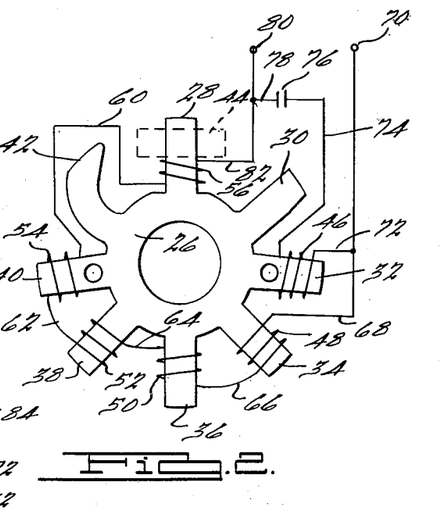
FIG. 2 is a schematic representation of a portion of the apparatus of FIG. 1, drawn so as to more clearly set forth the electrical relationships.

As may best be seen in the schematic representation of FIG. 2 of the drawings, coils 48, 50, 52, 54 and 56 are serially interconnected between the output terminals 70 and 80, with the direction of winding of adjacent coils being reversed. While coil 46 on coil leg 32 could be similarly connected in series with the other auxiliary power coils, the disclosed arrangement has been found to produce very substantially improved results over such an arrangement. Representatively, coil 46 is serially interconnected with a capacitor 76 across the output terminals 70 and 80, so that this series network is connected in parallel with the aforesaid serially interconnected coils 48–56.

It is possible that the network including capacitor 76 functions, primarily, to advantageously modify the voltage-current phase relationships to provide an improved output, or to generate a phased auxiliary output coupling with the primary output to provide an improved total output. However, it would be expected that exceedingly large values of capacitance would be required for such a function, whereas in the present arrangement relatively small and cheap capacitors are or may be employed. A complete and fully satisfactory theory of operation has not been definitively established. It is the applicant's belief, based upon his analysis and testing, that the network including coil 46 and capacitor 76 functions as a series resonant circuit which is periodically excited to generate a damped train of oscillations at its resonant frequency, with the rate of attenuation being controlled by the resistive component in the circuit, primarily the resistance of coil 46.

In oscillographic studies, it was apparent that the output wave form was very substantially improved by the connection of the resonant network across the remaining coils. Thus, without the series resonant network, the output voltage tended to be more nearly assimilable to a sawtooth wave form than a sinusoidal wave form. With the series resonant circuit connected, the wave form was more nearly sinusoidal, and also evidenced the presence of higher-frequency components.

In a practical embodiment of the invention, similar to that represented in FIG. 1 of the drawings, the effective cross-sectional area of the legs was about 0.16 sq. in., coils 48, 50, 52, 54 and 56 were all wound of No. 18 copper wire, with coils 48, 50 and 52 each having 96 turns, with coil 54 having 44 turns and with coil 56 having 74 turns spaced limitations controlling the number of turns for the most part. Coil 46 comprised 237 turns of No. 24 wire. Capacitor 76 was varied in size over a range of from about ten microfarads to about fifty-five microfarads, with fifteen or thirty microfarads being found to produce a satisfactory generator output for the use to which the tested generator was being put.

With a test load of two parallel-connected lamps of two and twenty-two candle power, respectively, it was found that with a constant running speed, (e.g., 2800 r.p.m.) the output volt-amperes increased substantially upon the addition of the series resonant circuit. Thus, with coil 46 and capacitor 76 disconnected, the output was found to be 11.3 volt amperes. With the series resonant circuit then connected, and capacitor 76 having a value of fifteen microfarads, the output volt-amperes rose to 14.6, an increase of about 30%. With a thirty-one microfarad capacitor used as capacitor 76, the volt-ampere output increased to 17.2, a total increase of about 50%. The effect of the resistive component in the series resonant circuit was investigated by inserting a resistor in series with capacitor 76 and coil 46. Employing an eighteen-ohm resistor, but with no other factors being changed, the volt-ampere output was reduced some 20%. At a higher engine speed (4000 revolutions per minute) the addition of the network comprising coil 46 and capacitor 76, with capacitor 76 having a fifteen-microfarad value, produced an increase in the volt-ampere output of some 70%.

The increase in output resulting from the incorporation of the resonant network in the system permits the attainment of the requisite nominal voltage at lower engine speeds than has heretofore been feasible. It also permits an increased freedom for tailoring the output versus rotational speed curves to attain flatter output characteristics. Thus, it is recognized that regulation may be achieved by proper selection of the the core size and materials to control the effective point or region of core saturation. However, with conventional generators it has been difficult to provide adequate voltage at low engine speeds and yet to prevent an excessive output signal at higher engine speeds, with the result that load devices employed with such generators have been subjected to overload and frequent damage.

The increase in output at any given driven speed provided by the practice of the principles of the present invention permits a substantially greater freedom in the design of the electro-magnetic circuits. Further, with any given core and coil structure, the output voltage versus speed characteristics can be controlled by varying the size of capacitor 76. As an example, with a practical structure placed under test, at a 4000 r.p.m. driven speed, the output volt-amperes increased some 70% (as above noted) when the resonant circuit comprising coil 46 and capacitor 76 was added to the generator, with capacitor 76 having a value of fifteen microfarads. However, by increasing the value of capacitor 76 from fifteen to thirty-one microfarads, the output volt-amperes were reduced some 15%.

With capacitor 76 having a value of fifteen microfarads, a change of motor speed from 2800 revolutions per minute to 4000 revolutions per minute produced an increase in output volt-amperes in excess of 100%. By increasing the value of capacitor 76 to thirty-one microfarads, the increase in volt-amperes from a driven speed of 2800 revolutions per minute to a driven speed of 4000 revolutions per minute was less than 50%. By further increasing the value of capacitor 76, the system can be tailored so that there is no increase in output with increased engine speeds above a preselected speed. Thus, for example, with a forty-two microfarad capacitor employed in a different pragmatic embodiment of the invention, the output volt-amperes increased from 7.5 to 25.5 with an increase of engine speed from 1650 to 3150 revolutions per minute, but with a further increase of engine speed to 3900 revolutions per minute, the volt-ampere output was reduced to 18.9. Thus, in any given application of the principles of the invention, it is only necessary to determine the maximum output which should be provided for any given load, and by varying the core construction or the value of the capacitor, or both, the output voltage may be limited to that value at or above any preselected driven speed.

Under static conditions, the network comprising coil 46 and capacitor 76 appeared to be resonant at about 500 cycles per second when the value of capacitor 76 was thirty microfarads (approximately) and at about 360 cycles per second when the value of capacitor 76 was increased to fifty-five microfarads (approximately). In both cases, the resonant frequency was higher than the normal output frequency of the generator.

It will be appreciated that the arrangement shown in FIGS. 1 and 2 may be modified substantially within the scope of the present invention. Thus, for example, the provision of eight core legs is purely representative as is the utilization of five of those core legs as the primary voltage coils. It is feasible to employ more than one coil as an element of the added network and this has been done in certain practical embodiments of the invention. It is, of course, not necessary to the operation of the device that it also serve as a magneto for producing ignition current. Further, the core structure may be disposed outside of the rotating permanent magnet field structure in accordance with the well-known principles of generator design. Again, in that case, any appropriate number of coils may be connected as the primary voltage generating coils and any finite number of coils may be associated with the capacitor to accomplish the improved results taught herein. Obviously, the field may be of any suitable type and it is not important to the electrical operation of the system whether it is in the field or the core structure which physically rotates.

Figure 3:
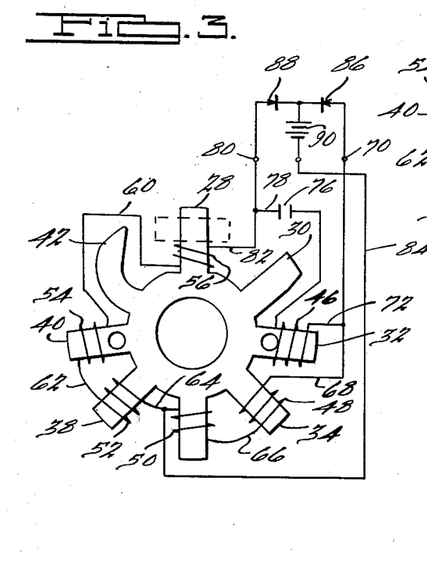
FIG. 3 is a schematic representation of a modified form of the generator of FIG. 2.

The arrangement of FIG. 3 is presented to demonstrate how the generator output may be full-wave rectified to charge a storage battery so that battery may serve as an ancillary power source. The employment of a battery, of course, permits a more steady supply voltage for the energization of lamps or other auxiliary equipment and, additionally, provides a source of available energy when the engine is not running for energizing an automatic starter.

It is feasible to connect output terminals 70 and 80 of the arrangement of FIG. 2 through a full-wave bridge rectifier to provide a direct voltage output to the load devices or battery. As is demonstrated in FIG. 3, it is also feasible to accomplish full-wave rectification by the use of but two rectifiers if a center tap is provided among the serially interconnected voltage coils. Thus, conductor 84 is connected to conductor 66, which, with the representative parameters heretofore indicated, constitutes roughly a center tap for the five voltage coils 48–56. An exact center tap could be obtained by tapping into coil 50 at an appropriate point. Terminals 70 and 80 are connected through individual dry-disk rectifiers 86 and 88 to one terminal of a load device, such as battery 90, the other terminal of which is connected to conductor 84.

It has been found that with this arrangement, adequate current may be provided to charge battery 90 at a suitable rate for most applications of the device. In a pragmatic arrangement, in which additional charging current was required, in the order of ten amperes, six coils correlative to coils 48–56 were provided, and two pickup coils correlative to coil 56 were associated with the capacitor.

Figure 4:
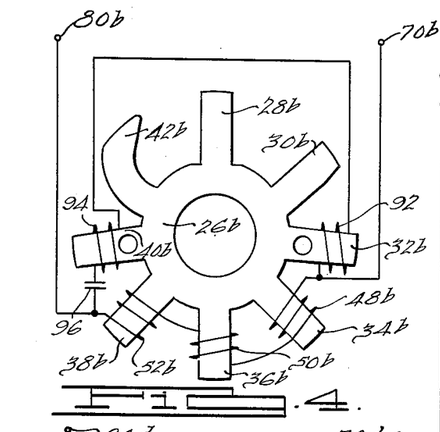
FIG. 4 shows a further modification including a single active plural-coil network.

The modification suggested above, wherein a plurality of coils are employed as elements of the added network, is represented in FIG. 4 of the drawings in which a core structure 26b, having legs 28b to 42b, is representatively utilized. A plurality of main generating coils 48b, 50b and 52b (adjacent ones of which are wound reversely) are serially connected between the load terminals 70b and 80b. The active network comprises coils 92 and 94 wound, in proper phase relationship, upon legs 32b and 40b and connected in series with one another, and with a capacitor 96, across the load terminals 70b and 80b. Therefore, the active network, comprising elements 92, 94 and 96, is effectively connected in parallel with the serially interconnected coils 48b to 52b across the load.

Figure 5:
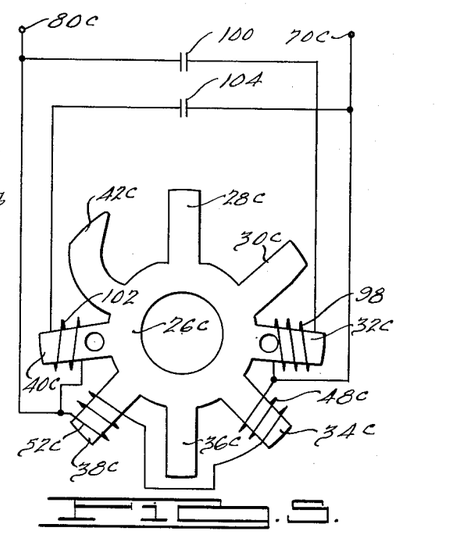
FIG. 5 shows a further modification in which dual active networks are connected across dual main windings.

It is also contemplated that the active network may comprise a plurality of branches. Otherwise stated, it is contemplated that a plurality of active networks may be employed in conjunction with the main generating coils. In the arrangement of FIG. 5, two main generating coils 48c and 52c, disposed upon core 26c, are serially connected across the load terminals 70c and 80c. Coil 98, wound upon leg 32c, is connected in series with capacitor 100 between terminals 70c and 80c, forming a first active network. Another such network comprising coil 102, wound on leg 40c, and capacitor 104, is connected between terminals 70c and 80c, the phase relationships of the several coils being appropriately selected. Thus, in the arrangement of FIG. 5, two series inductance-capacitance networks are connected in parallel with each other and with the main generating coils across the load terminals, the inductive elements in each of those networks being active generating units.

Figure 6:
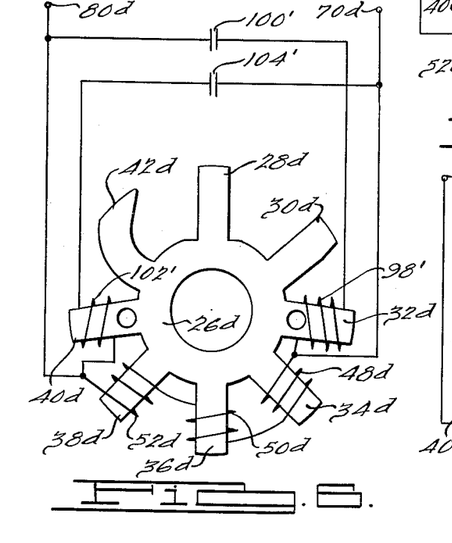
FIG. 6 shows a further modification identical to that of FIG. 5, except for the provision of an additional main winding.

The arrangement shown in FIG. 6 is identical to that shown in FIG. 5, except that three main generating coils 48d, 50d and 52d are provided, the active networks being identical to those of FIG. 5 and the parts thereof being identically identified except for the addition of a prime symbol to the reference characters.

Figure 7:
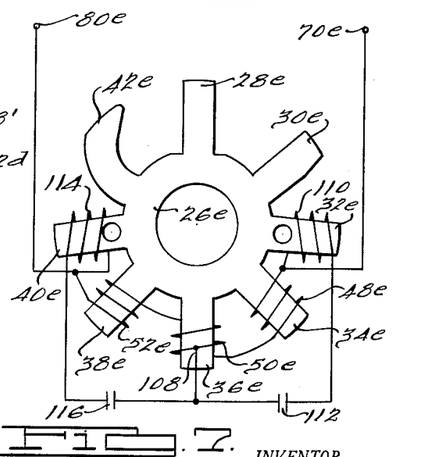
FIG. 7 shows a further modification in which an active network is bridged across each half of a center-tapped main winding system.

In the arrangement of FIG. 7, a core structure 26e, having legs 28e to 42e, is provided with five individual windings or coils. Of these, coils 48e, on leg 34e, 50e on leg 36e, and 52e on leg 38e are serially interconnected, in appropriate polarity, across the load terminals 70e and 80e. That group of coils is center-tapped as at 108. A coil 110, wound in proper phase relationship upon leg 32e, is connected in series with capacitor 112 between load terminal 70e and the center tap 108 and, correlatively, a coil 114, wound in proper phase relationship upon leg 40e, is connected in series with capacitor 116 between load terminal 80e and the center tap 108. In this arrangement, an individual active network, comprising one or more active coils and a capacitor, is connected across each half of the total main generating or load coil system.

Each of the arrangements shown in FIGS. 4 to 7 has been found to operate properly and advantageously and in accordance with the principles of the present invention. In each case, three legs of the core structure have been reserved for use as elements of a magneto-ignition system if desired, although it will be appreciated that the presence or absence of magneto coils on the main core structure is not significant to the generating function performed by the apparatus disclosed.

In the modified arrangement, illustrated in FIGS. 8 to 11 of the drawings, the resonant network consists of a unitary and integral element, and possesses certain advantages from a cost and space standpoint over the networks employed in the other described arrangements.

Figures 8, 9, 10, 11, 12:
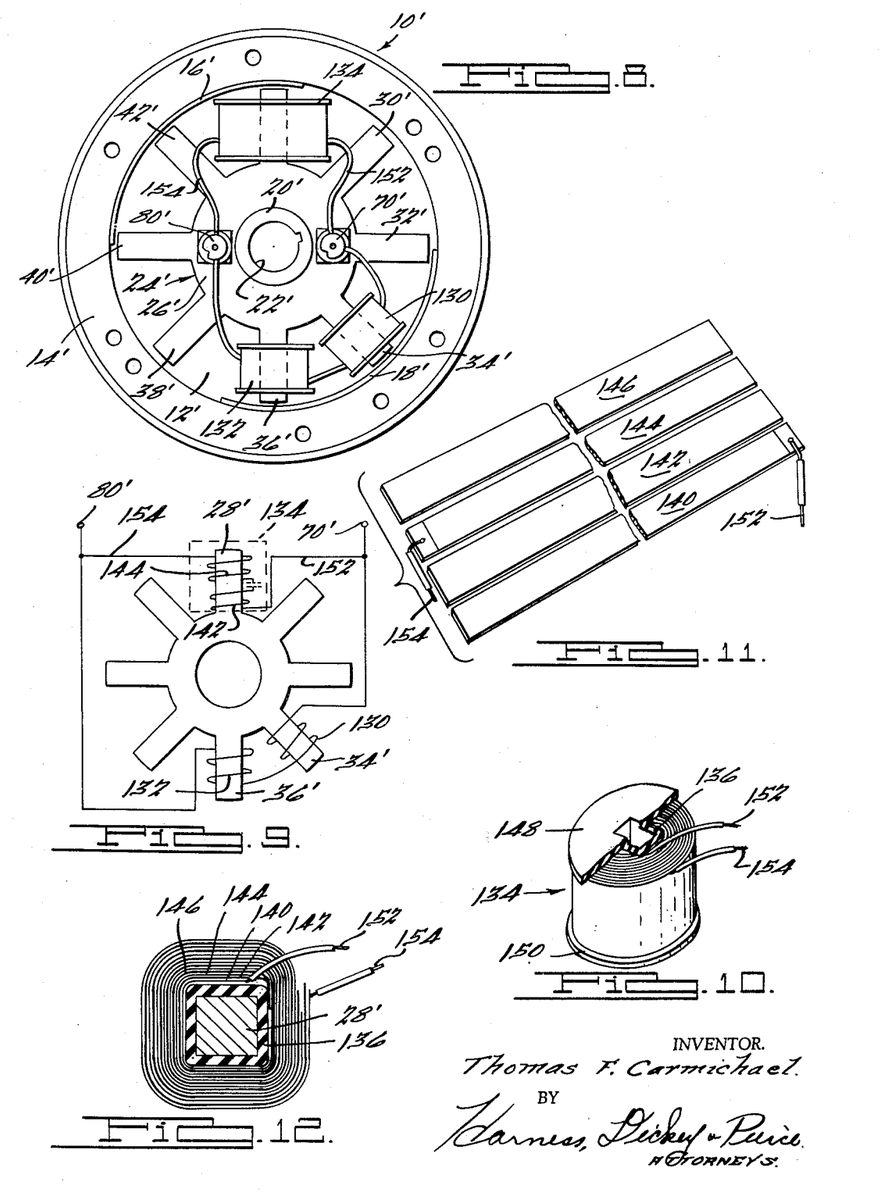
FIG. 8 is a plan view of the underside of a modified generator assembly embodying certain of the principles of the present invention.
FIG. 9 is a schematic representation of a portion of the apparatus of FIG. 8, drawn so as more clearly to set forth the electrical relationships.
FIG. 10 is a perspective view, partially cut-away, of one of the elements of the apparatus of FIG. 8.
FIG. 11 is a perspective view of certain of the elements utilized in the construction of one form of the element illustrated in FIG. 10.
FIG. 12 is a schematic representation of a cross-section of the element of FIG. 10, the relative sizes and spacings of the parts being greatly distorted for purposes of clarity.

The generator structure of FIG. 8 is generally similar to that of FIG. 1, with corresponding parts being designated with corresponding reference characters suffixed by a prime. In the illustrative arrangement disclosed, load coils 130 and 132 are mounted upon the legs 34' and 36', respectively, and are connected in series with one another, with an appropriate reversal of their directions of wind (FIG. 9), across the output or load terminals 70' and 80'.

An element 134, acting electrically as a resonant network, is disposed upon leg 28', and its two terminals are connected to the output terminals 70' and 80' so that element 134 is connected in parallel with the series interconnected load coil 130 and 132. Element 134 is structurally similar to a capacitor but is formed so as to have a relatively high inductance. Elements 134 have been successfully employed in which the unit is formed somewhat similarly to conventional plate ("paper tubular") capacitors as well as in which the unit is constructed in accordance with known techniques for forming conventional non-polar electrolytic capacitors. The former arrangement is illustrated.

Unit 134, as shown in FIG. 10, comprises an insulating tubular coil former 136. The longitudinally extending bore of former 136 has a cross-section generally corresponding to the shape of the pole member with which it is to be associated. Leg 28' is illustrated to have a rectangular and generally square cross-section in FIG. 12, so that the internal surface of former 136 is similarly shaped. The wall thickness of former 136 may be formed to a radius, as illustrated, or the exterior surface of the former may be circular, if desired.

A winding assembly 138 is disposed upon former 136. The constituent parts of a representative winding assembly, as illustrated in FIG. 11, include two conductive strips 140 and 144 and two insulating strips 142 and 146. In a constructed unit, strips 140 and 144 were each formed of thick aluminum foil, 0.0002 inch in thickness, and were each about one inch in width. Insulating strips 142 and 146 may be any appropriate dielectric material such as certain paints, paper, or plastic films. A film sold under the name Saran, a vinylidene chloride vinyl chloride copolymer, and a film sold under the name Mylar, polyethylene terephthalate, have been used. In certain constructed embodiments, the film was of about the same thickness as the aluminum strips and slightly wider, e.g. one and one-eighths inches wide.

With insulating 142 interposed strips 140 and 144 and with strip 146 above strip 144, the assembly is wrapped around the former 136 in spiralled layers, conductive strips 140 and 144 being electrically insulated from one another over their entire lengths. The two conductive strips 140 and 144 may be of equal lengths to obtain maximum capacitance in unit volume, or the inductance of the unit may be increased without effectively increasing the total capacitance by making one of the conductive strips longer than the other in the manner illustrated in the view of FIG. 12. In that view, the thickness of the several strips and the inter-strip spacing are greatly exaggerated for clarity of representation.

It will be appreciated that the dielectric material can be in the form of a film integral with the metallic plates, that an electrolyte may be disposed between the conductive strips, and that the unit may be otherwise formed in accordance with known techniques for manufacturing non-polar electrolytic capacitors.

In the illustrative showing of FIG. 10, end caps or spoolheads 148 and 150 are integral with or secured to the former 136, and the entire unit may, if desired, be enclosed or sealed in a canister or case.

Conductors 152 and 154 are secured to conductive strips 140 and 144, respectively. For reasons to be noted, these electrical connections are made at the opposite ends of the strips (FIG. 11), so that conductor 152 is secured at the inner end of winding 140 (FIG. 12) and conductor 154 to the outer end of winding 144. Conductors 152 and 154 are connected to output terminals 70' and 80' (FIGS. 8 and 9) and hence across the load coils 130 and 132.

The resulting unit, when placed upon a leg of the field structure acts, in cooperation with a movable permanent magnet, as a resonant network including a voltage-generating coil and a capacitor, that is, the unit acts in the same manner as the network including the two discrete elements 56 and 76 in the arrangement of FIGS. 1 to 3.

It will be perceived that conductor 152 is connected to one end of, in effect, a coil or winding 140 wound around leg 28', and that conductor 154 is connected to one end of, in effect, a second coil or winding 144 wound around that same leg 28', there being no direct conductive connection between the two windings 140 and 144. However, the two windings act as the two plates of a capacitor so that the two coils are capacitatively interrelated. With the illustrated construction, it seems probable that each turn of winding 140 is capacitatively coupled (in addition to any inductive coupling which may exist) to at least the adjacent turn of winding 144.

However, that distributed capacitance between the two windings 142 and 144 can be represented, in its effect, as a lumped capacitance 156 (FIG. 9) interconnecting those two ends of windings 142 and 144 which are not connected to conductors 152 and 154.

Plate type (non-electrolyte) units have been constructed, as an example, in which the strips 140 and 142 are of sufficient length to form 378 turns upon the former 136. With the unit off of the core structure, that is with an air core, these units have a measured capacitance of about 4½ microfarads. The resonant frequency is about 1300 cycles per second.

In order that the two coils wound in the same direction upon the core leg 28' will be in the proper aiding relationship, the connections should be, as shown, to the outer end of one winding and to the inner end of the other.

In tests of the above-described unit, one terminal of a resistive load (5.1 ohms resistance) was connected to a center tap of the load coils, that is, between load coils 130 and 132. The other terminal of the load resistor was connected to the output terminals 70' and 80' through individual rectifiers to provide full-wave rectification of the output of the generator and D.C. energization of the load. The circuit was similar to that shown in FIG. 3, but with a resistance rather than a battery load. The load coils were each formed of 129 turns of wire. With a three-magnet wheel, the output to the load ran from about two volt-amperes at 1500 r.p.m. to about 27½ volt-amperes at 4500 r.p.m. As an indication of the measure of improvement, the output volt-amperes at 4500 r.p.m. was about 60% greater than that which was obtained when the same structure was operated without the resonant circuit.

Electrolytic units having measured capacitances of up to 30 microfarads have been constructed and successfully tested. For example, a structure and circuit identical to that described above except for the substitution of an inductor-capacitor unit having a measured capacitance of 23 microfarads produced an output of 2.3 volt-amperes at 1500 r.p.m. and 32 volt-amperes at 4500 r.p.m., the latter of which represents an increase of about 85% over the output of the same unit with the resonant network disconnected. The use of a 30 microfarad unit in which the number of turns was increased beyond that required to produce that magnitude of capacitance by adding turns of wire to the outside of the structure (although that result could also be accomplished in the manner above described with reference to FIG. 12) produced outputs which increased from about three volt-amperes to about 47 volt-amperes at 4000 r.p.m. With a further increase in rotational speed to 4500 r.p.m., the output fell to about 39 volt-amperes, illustrating that the output/speed curve of units utilizing unitary networks can be tailored to specification just as can the generators in which the networks are formed of plural discrete units. Thus, by reducing the added turns about 10%, no drooping of the output voltage curve occurred in the range up to 4500 r.p.m., and the output at both 4000 and 4500 r.p.m. was increased, reaching 60 volt-amperes in the latter case.

The disclosed circuit arrangement is, of course, purely representative. Unitary networks may be substituted, for example, for each of the plural-unit networks shown in FIGS. 1 to 7 of the drawings, as well as in other arrangements within the scope of the invention. The physical structure shown in FIG. 8 is but illustrative of a suitable, operable arrangement, and may be modified within the knowledge of those skilled in the art, as was previously discussed in connection with the structure of FIG. 1. The output of the generator may be applied to any appropriate load and has been successfully utilized in the charging of storage batteries.

Similarly, the disclosed construction of a unitary capacitor-inductor assembly comprising a pair of spirally disposed conductive elements having dieelectric material therebetween so that they act both as voltage-generating coils and as the plates of a capacitor is but representative.

Figure 13:
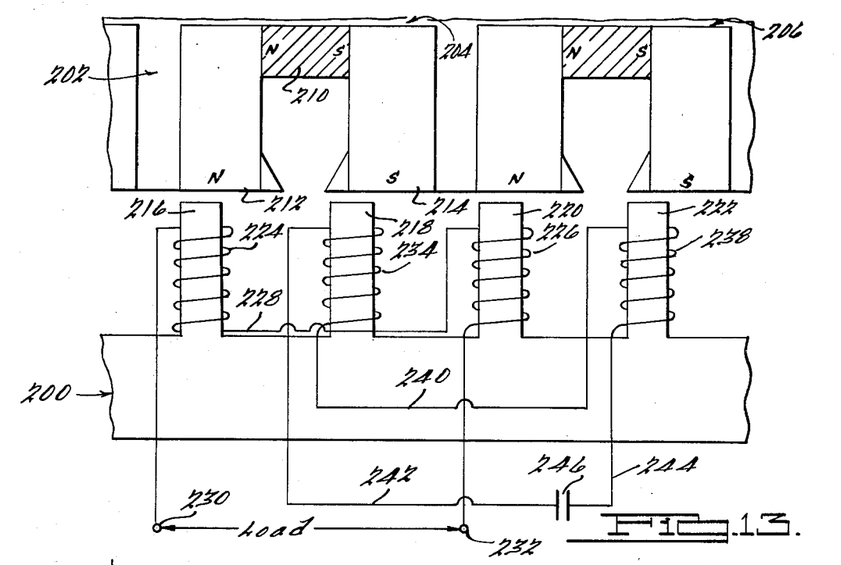
FIG. 13 is a diagrammatic representation of another structure embodying certain of the principles of the present invention.

In the arrangement illustrated in FIG. 13 of the drawings, the two relatively moving parts 200 and 202, the stator and the rotor, of the generator are illustrated fragmentarily and rectilinearly for simplicity. Element 202 carries integrally mounted therein a plurality of spaced-apart field elements 204 and 206 (symbolically represented in the drawings) each of which includes a permanent magnet, such as permanent magnet 210, and a pair of oppositely poled shoes, such as shoes 212 and 214.

The stator 200 comprises a magnetizable core member having a plurality of projecting or salient poles such as poles 216, 218, 220, and 222 extending into proximity of the rotor shoes. The distance between the centers of adjacent poles is illustrated to be substantially equal to the distance between the effective centers of adjacent shoes.

Windings 224 and 226, disposed upon poles 216 and 220, respectively, are representatively connected in series, in proper polarity, by means of a conductor 228 interconnecting one terminal of winding 224 and one terminal of winding 226, with the other terminal of winding 224 being connected to output or load terminal 230 and with the other terminal of winding 226 being connected to the output or load terminal 232. These windings are herein characterized as "load" windings or coils.

Windings 234 and 238, disposed upon poles 218 and 222, respectively, are connected in series with one another, in proper polarity, and the series combination of windings 234 and 238 is connected across a capacitor 246. Thus, one terminal of winding 234 is connected by conductor 240 to one terminal of winding 238, the other terminal of winding 234 is connected to one terminal of capacitor 246 by conductor 242, and the other terminal of winding 238 is connected to the other terminal of capacitor 246 by conductor 244.

It will be observed that in the illustrated relative position of the rotor and stator, a magnetic circuit is established from the north pole of magnet 210 through shoe 212, through pole 216, through a portion of the core of the stator 200, through pole 218, through shoe 214, and return to the south pole of magnet 210. Therefore, in this bipolar magnetic circuit, poles 216 and 218 lie, at times, in the same magnetic circuit and are energized by the same permanent magnet 210, and the windings 224 and 234 are magnetically coupled to one another via this magnetic circuit. These spatial relationships result in both winding 224 and winding 234 entering a changing magnetic field, during operation of the generator, at the same instant. While there is or may be some flux linking winding 224 with windings other than winding 234 at the instant shown in FIG. 13, and while there may be some flux linking winding 234 with windings other than 224 at the same instant, the reluctance of the circuit between those adjacent poles which are not at that instant in the same primary magnetic circuit, such as the circuit described, is substantially greater than the reluctance of the described magnetic circuit.

Due to the physical spacings, poles 220 and 222 are in a common magnetic circuit with the field member 206 at the same time that poles 216 and 218 are in a common magnetic circuit with field structure 204. Accordingly, the load windings 224 and 226 may, with proper observation of polarity, be interconnected in series or in parallel in the normal fashion.

The circuit including windings 234 and 238 and capacitor 246 serves as a resonant circuit having a resonant frequency selected to equal the frequency of the alternating voltage generated by load windings 224 and 226 at a selected relative rotational velocity of the rotor and stator. This resonant circuit is, in effect, shock excited each basic half cycle, that is, it is shock excited or forced into oscillation each time that the pole 218 with which winding 234 is associated (and each time that pole 222 with which winding 238 is associated) encounters a reversal of the magnetic polarity of the associated poles. In response to this shock excitation, the circuit including winding 234 and winding 238 and capacitor 246 resonates, producing damped oscillations of varying durations. In a tested embodiment of the invention in which the resonant circuit had a fairly low Q, it was found that in response to a single shock excitation, the produced damped oscillations remained of significant amplitude in the order of three to five half cycles. In a system such as that illustrated, this storage of energy within the resonant circuit and the initiation of a new train of damped oscillations occurs each half cycle so that the energy in the resonant circuit is periodically replenished.

On the basis of oscillographic studies and in view of the relationship between the resonant frequency of the tuned circuit and the output frequency of the generator, it is understood that the resonant circuit receives energy from the magnetic circuit at one reversal of the flux and at a time during which each of the resonant-circuit-winding-carrying poles, such as pole 218, is primarily in a magnetic circuit with the adjacent load-winding-carrying pole in one direction, such as pole 216. It is further believed that this energy is transferred to the capacitor 246 and is returned to the resonant circuit windings, such as winding 234, one half cycle of the resonant frequency thereafter, and that if the relative rotational velocity between the rotor and stator is such that the output frequency of the generator is within a broad region adjacent the resonant frequency of the tuned circuit, the redelivery of the energy to the resonant circuit windings and the resultant induction of a flux in the poles associated with those resonant circuit windings occurs approximately 180 electrical degrees later at the output frequency of the generator. Consequently, in accordance with this understanding, the energy is received by a resonant circuit winding at a time at which its pole is in magnetic circuit with one load-winding-carrying pole, such as pole 216, and the energy is or may be delivered from the resonant circuit at a time at which the associated pole is in common magnetic circuit with a different one of the load-winding-carrying poles, such as pole 220.

While the true nature of the phenomena that lead to the greatly improved results which accrue from the practice of the principles of the present invention have not been definitively established, it is theorized, in the light of the available information, that when the generator output frequency is in the broad region of the resonant circuit frequency, the resonant winding, in releasing its energy, induces flux in its pole and in the load-winding-carrying pole then in magnetic circuit therewith which leads by a small angle the flux then induced in that load-winding-carrying pole by the permanent magnet field. This flux, according to present understanding, can be resolved into two components: a large magnitude component in phase with and aiding the permanent magnet created flux, and a smaller component in leading quadrature therewith. The in-phase and aiding component produces a very substantial increase in the total flux in the load-winding-carrying pole so that the resultant voltage which is induced across the turns of the load winding is correspondingly increased. Since the load winding produces, as a result of the transfer of energy therefrom to the load, a relatively small magnitude demagnetizing current in the pole in lagging quadrature, the leading quadrature component of the flux produced by the resonant circuit serves to cancel or minimize the demagnetizing effect of the load winding. As so viewed, both components of the resonant-circuit-induced flux contribute to the improved results which are achieved in the disclosed constructions.

The coupling of the resonant circuit to the load circuit to permit the transfer of energy can be exclusively magnetic, electrical, or as illustrated in connection with the preceding figures of the drawings, can be magnetic supplemented by an electrical interconnection.

This theory is based in part on the observation of a constructed embodiment of the invention in which it was indicated that the flux induced in the magnetic circuit by the resonant circuit led the flux induced in that same magnetic circuit by the permanent magnet by 33 electrical degrees, indicating an in-phase flux component having a magnitude equal to about 84% of the total flux induced in that magnetic circuit by the resonant circuit and a component in leading quadrature having a magnitude equal to about 54% of that total flux.

In a constructed embodiment of the arrangement illustrated in FIG. 13, the rotor was provided with eight permanent magnets each having a pair of oppositely poled shoes, a total of sixteen shoes. The core or stator had sixteen poles each having a cross-section one-quarter inch by one and one-half inches and each extending to within about 0.010 inch of the rotor. Eight load windings, each consisting of 54 turns of No. 18 copper wire, were wound on alternate ones of the poles and each of the remaining alternate poles carried a resonant-circuit winding formed of 100 turns of No. 21 copper wire. Four of the load windings were connected in series to form a first group, the remaining four load windings were connected in series to form a second group, and the two groups were connected in parallel and to the load terminals. The resonant-circuit windings were all connected in series with one another and with a capacitor. There were no electrical connections in normal operation between the load circuit and the resonant-circuit windings or capacitor.

It will be observed that in accordance with the presented theory, the resonant-circuit windings served to induce flux having both a load current producing component and a demagnetizing current cancelling component so that those windings conjointly serve as load energy producing copper and for magnetic field correction.

In testing, the power available per pole with that construction was compared with the power available per pole when all poles were equipped with load coils, that is, without any resonant circuits, and it was found that the power output of the generator was substantially increased throughout a broad range of generator output frequencies including all generator output frequencies below, at, and above the resonant frequency of the tuned circuits up to the point at which the generator output frequency was about one and one-half to two times the resonant frequency of the tuned circuits.

Figure 14:
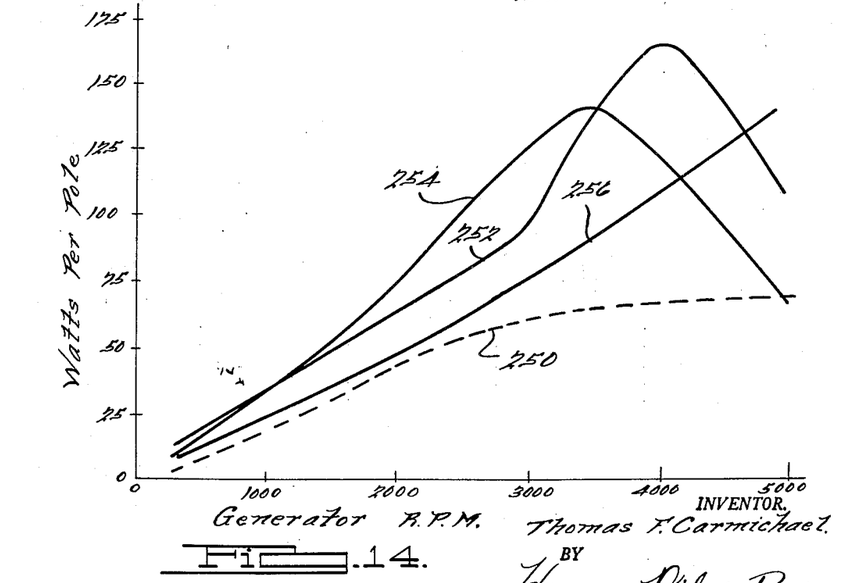
FIG. 14 is a curve illustrating certain available power versus generator speed relationships in a constructed embodiment of the invention.

The power output of the just-noted constructed embodiment was observed on a per-pole basis with various values of capacitance and the results of one series of tests are represented in the graph constituting FIG. 14 of the drawings. That graph is a plot of the watts of energy available per pole as the ordinate versus the generator rotational velocity in revolutions per minute as the abscissa. The abscissa also represents the generator output frequency in cycles per minute.

Curve 250 represents the output that was obtained over a range of generator rotational velocities from below 1000 r.p.m. to 5000 r.p.m. in which the poles under study were equipped solely with conventional load windings, with no resonant circuits being provided. With the resonant circuits in place and including a 12 microfarad capacitor, the output power available per pole increased quite substantially as is illustrated in curve 252. The resonant circuit produced an increased power available per pole which reached a maximum at about 4000 r.p.m., that is, 4000 c.p.m., which was the resonant frequency of the tuned circuit. At 1000 r.p.m., the power available per pole increased from 22 watts with no resonant circuit to 32 watts with the resonant circuit connected; at 2000 r.p.m., the power per pole increased to 62 watts as compared to 46 watts without the resonant circuit feature; at 3000 r.p.m., the power per pole was 95 watts versus the 64 watts illustrated in curve 250 for that rotational speed; and at 4000 r.p.m., the power per pole with a resonant circuit was 160 watts as compared to 70 watts available from the generator having all load windings. The power available per pole continued to be larger above the resonant frequency than that produced by the generator without the resonant circuits up to the highest rotational velocity than the generator was adapted to be turned. At 5000 r.p.m., while the output power available per pole reduced relative to that at 4000 r.p.m., it was still 114 watts as compared to the 70 watts available with the standard generator.

Increasing the capacitor to a value of 15 microfarads produced the relationship illustrated in curve 254, in which the power available per pole in a range from 1000 r.p.m. to about 3400 r.p.m. was greater than with the 12 microfarad capacitor, but the output power available per pole at higher rotational velocities fell off, and was approximately equal to the output of the generator with but load windings at 5000 r.p.m. The use of a smaller capacitor, such as a 9 microfarad capacitor, of course produced a higher resonant frequency with the same turns, leading to the relationship illustrated in curve 256 in FIG. 14 of the drawings.

The substantial improvement in the available output power resulting from the utilization of the resonant networks is evidenced by the above described curves. Under the theory hereinbefore advanced, these power improvements would connote a very substantial component of additional flux in the load-winding-carrying poles by the resonant circuit action, and this belief is confirmed by the fact that it was found that the voltages developed across each of the resonant windings reached relatively high magnitudes even though the output voltage of the generator was small, which necessitates, with resonant windings having large numbers of turns, the use of capacitors having relatively high voltage ratings.

As above noted, it has been found to be advantageous to employ relatively low Q circuits. If the resistance of the windings does not produce an adequately broad resonant peak, resistance can be added in series with the resonant circuit elements.

Another advantage accruing from the use of the resonant circuits was found to be in the quite substantial improvement of the shape of the output wave form. Over a range of frequencies in the region of the resonant frequency of the tuned circuit, it was found that the output wave form very closely approached a sine wave. This improvement in the output wave form would appear to be partly attributable to the fact that the resonant circuit operates sinusoidally and in part to be attributable to the low impedance of the capacitor to high frequency currents thus producing a shorted turn or damped winding action tending to prevent the formation of steep wave fronts in the magnetic field.

By virtue of the preferred construction, the load windings and resonant circuit windings are physically divorced and physically spaced so that each may be designed substantially independently of the other and substantially exclusively in the light of its own design considerations.

It will be appreciated that in the structure of FIG. 13, the several load windings may be interconnected in any suitable fashion, that each resonant circuit winding may be provided with an individual capacitor, that a single capacitor may be associated in common with all of the resonant circuit windings, or that a plurality of capacitors may be associated with a plurality of groups of resonant circuit windings.

In another constructed alternator which was tested for use as an element of an automotive electrical system, the stator was provided with sixteen poles and the rotor was provided, in effect, with eight permanent magnets each having, in effect, a pair of oppositely poled shoes or polar areas associated therewith.

Each pole of the stator had a cross section of one-quarter inch by one and one-half inches and each was one and five-sixteenths of an inch long. The spacing between the tips of the poles and the rotor was about 0.015 inch. Alternate ones of the stator poles were provided with load windings, each such winding consisting of 45 turns of No. 15 copper wire. With proper attention to polarity, four of the load windings were connected in series, the other four windings were connected separately in series, and the two groups of series-connected windings were connected in parallel and to the load. The alternate eight poles were occupied with tank or resonant-circuit windings each of which was formed of 100 turns of No. 21 copper wire. The eight tank windings were connected in series with one another and that group of serially interconnected windings was then connected across a 5 microfarad capacitor.

Since the alternator was designed for use as an automotive generator, the output or load terminals were connected to a full wave bridge rectifier formed of four appropriately interconnected and poled 35 ampere rectifiers each rated at 200 volts. The output of the bridge rectifier, without filtering, was connected across a 12 volt automobile battery. Since it was contemplated that the generator would be driven by the automobile engine through a power transmission system having a two-to-one step-up ratio, the generator was tested over a rotational velocity range from 1000 r.p.m. through 10,000 r.p.m. The battery was not fully charged at the start of the test, and the test was completed sufficiently rapidly to prevent the battery from becoming fully charged during the course of the test.

At a rotational speed of the generator of 1000 r.p.m., the output current of the rectifier as applied to the battery was 12 amperes; at 2000 r.p.m. (1000 r.p.m. of the automobile engine), the output current of the rectifier was 29.5 amperes; at 3000 r.p.m., 36 amperes; at 4000 r.p.m., 40 amperes; at 5000 r.p.m., 43 amperes; at 6000 r.p.m., 44.5 amperes; at 7000 r.p.m., 44.5 amperes; at 8000 r.p.m., 43 amperes; at 9000 r.p.m., 41.5 amperes; and at 10,000 r.p.m., 40 amperes.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a generator, a pair of output terminals, a multiple pole magnetic structure including a plurality of pairs of poles, the two poles of each pair being spaced substantially 180 electrical degrees apart and being at least at times in a common magnetic circuit, first voltage-generating winding means on at least one of said poles of each of said pairs of poles for producing a voltage difference between said terminals, and a resonant network including another voltage-generating winding means disposed upon at least one of the poles of at least one of said pairs of poles and magnetically linked to at least one of said first voltage-generating winding means.

2. In a generator, a pair of output terminals, a multiple pole magnetic structure including a plurality of pairs of poles, the two poles of each pair being spaced substantially 180 electrical degrees apart and being at least at times in a common magnetic circuit, a plurality of voltage-generating coils, each coil being on one pole of each of said pairs of poles, said coils being interconnected with one another for producing a voltage difference between said terminals, and a resonant network including another voltage-generating coil disposed on a different one of said poles and magnetically linked at times to one of said plurality of voltage-generating coils and at times to another one of said plurality of voltage-generating coils.

3. In a generator, a pair of output terminals, a multiple pole magnetic structure including a plurality of pairs of poles, the two poles of each pair being spaced substantially 180 electrical degrees apart and being at least at times in a common magnetic circuit, voltage-generating winding means on one of said poles of each of said pairs of poles for producing a voltage difference between said terminals, and a network including another voltage-generating winding means disposed upon and entirely occupying the winding space upon a different one of said poles of each of said pairs of poles and magnetically linked at least at times to at least the one of said first voltage-generating winding means which is disposed on one of the poles of the corresponding pair of poles and capacitative means.

4. In a generator, a pair of output terminals, a multiple pole magnetic structure including a plurality of pairs of poles, the two poles of each pair being spaced substantially 180 electrical degrees apart and being at least at times in a common magnetic circuit, a plurality of voltage-generating coils, each coil being on one pole of each of said pairs of poles, said coils being interconnected with one another for producing a voltage difference between said terminals, and a network including another voltage-generating coil disposed upon a different one of said poles of each of said pairs of poles and magnetically linked at least at times to at least the one of said plurality of voltage-generating coils which is disposed on one of the poles of the corresponding pair of poles and at times to at least another one of said plurality of voltage-generating coils, and capacitative means.

5. In a generator, a pair of output terminals, a multiple pole magnetic structure including a plurality of pairs of poles, the two poles of each pair being spaced substantially 180 electrical degrees apart and being at least at times in a common magnetic circuit, a plurality of voltage-generating coils, each coil being on one pole of each of said pairs of poles, said coils being interconnected with one another for producing a voltage difference between said terminals, and a plurality of networks, each including individual capacitative means and another voltage-generating coil disposed upon a different one of said poles of each of said pairs of poles and magnetically linked at least at times to at least the one of said plurality of voltage-generating coils which is disposed on one of the poles of the corresponding pair of poles and at times to at least another one of said plurality of voltage-generating coils, and connected in series with said capacitative means.

6. In a generator, a pair of output terminals, a multiple pole magnetic structure including a plurality of pairs of poles, the two poles of each pair being spaced substantially 180 electrical degrees apart and being at least at times in a common magnetic circuit, a plurality of voltage-generating coils, each coil being on one pole of each of said pairs of poles, said coils being connected in series with one another between said output terminals, and another voltage-generating coil and capacitative means connected in series with one another between said output terminals, said other voltage-generating coil being disposed upon a different one of said poles of each of said pairs of poles and magnetically linked at least at times to at least the one of said plurality of voltage-generating coils which is disposed on one of the poles of the corresponding pair of poles and at times to at least another one of said plurality of voltage-generating coils.

7. In a generator, a core structure including a plurality of poles, a magnetic field structure proximate to and rotatable with respect to said core structure, a pair of output terminals, first winding means on one of said poles of said core structure for producing a voltage difference between said terminals, capacitative means, and additional winding means on a different one of said poles of said core structure spaced substantially 180 electrical degrees from said one pole and magnetically linked to said first winding means, the combination of said capacitative means and said additional winding means being connected across said first winding means.

8. In a generator, a core structure including a plurality of poles, a magnetic field structure proximate to and rotatable with respect to said core structure, a pair of output terminals, first winding means on one of said poles of said core structure for producing a voltage difference between said terminals, capacitative means, and additional winding means on a different one of said poles of said core structure spaced substantially 180 electrical degrees from said one pole and magnetically linked to said first winding means, said capacitative means and said additional winding means being connected in series with one another and the combination of said capacitative means and said additional winding means being connected across said first winding means.

9. In a generator, a core structure including a plurality of poles, a permanent magnetic field structure proximate to and rotatable with respect to said core structure, a pair of output terminals, a plurality of coils on certain of said poles of said core structure and connected in series with one another between said output terminals, capacitative means, and coil means on a different one of said poles of said core structure spaced substantially 180 electrical degrees or a multiple thereof from said first-mentioned poles and magnetically linked to certain of said plurality of coils connected in series with said capacitative means between said output terminals.

10. In a generator, a field structure, a pair of output terminals, a core structure including a plurality of poles, means for rotating said structures relative to one another in a preselected range of relative rotational speeds, first winding means on one of said poles of said core structure for producing an alternating voltage between said terminals, and a resonant network connected across said winding means including additional winding means on a different one of said poles and magnetically linked to said first winding means, the resonant frequency of said network being greater than the frequency of said alternating voltage over at least a substantial portion of said range of relative rotational speeds.

11. In a generator, three output terminals, a field structure, a core structure, first winding means on said core structure for producing an alternating voltage difference between a first and a second one of said terminals, a connection between the third one of said terminals and a center tap on said first winding means, capacitative means, and second winding means on said core structure, the combination of said capacitative means and said second winding means being connected between said first and said second ones of said terminals.

12. In a generator, a pair of output terminals, voltage-generating winding means for producing a voltage difference between said terminals, and a resonant network connected across said winding means including a plurality of voltage-generating winding means.

13. In a generator, a pair of output terminals, voltage-generating winding means for producing a voltage difference between said terminals, and a network connected across said winding means including a plurality of voltage-generating winding means and capacitative means.

14. In a generator, a pair of output terminals, voltage-generating winding means for producing a voltage difference between said terminals, and a network connected across said winding means including a plurality of voltage-generating winding means and a plurality of capacitors.

15. In a generator, a pair of output terminals, a plurality of voltage-generating coils interconnected with one another for producing a voltage difference between said terminals, and a plurality of networks connected across at least certain of said coils, each of said networks including another voltage-generating coil and capacitative means.

16. In a generator, a pair of output terminals, a plurality of voltage-generating coils interconnected with one another for producing a voltage difference between said terminals, and a plurality of networks connected across at least certain of said coils, each of said networks including another voltage-generating coil and capacitative means connected in series with one another.

17. In a generator, a pair of output terminals, a plurality of voltage-generating coils interconnected with one another for producing a voltage difference between said terminals, a network connected across at least certain of said coils including another voltage-generating coil and a capacitor, and a network connected across at least certain other of said coils including another voltage-generating coil and capacitative means.

18. In a generator, a pair of output terminals, a plurality of voltage-generating coils interconnected with one another for producing a voltage difference between said terminals, a network connected across at least certain of said coils including another voltage-generating coil and capacitative means connected in series with one another, and a network connected across at least certain other of said coils including another voltage-generating coil and capacitative means connected in series with one another.

19. In a generator, a pair of output terminals, voltage-generating winding means for producing a voltage difference between said terminals, a connection to a point on said generating winding means between said terminals, and a network including another voltage-generating winding means spaced substantially 180 electrical degrees from said first winding means and a capacitor connected between one of said terminals and said connection.

20. In a generator, a pair of output terminals, a multiple pole magnetic structure, first voltage-generating winding means on one of said poles for producing a voltage difference between said terminals, a connection to a point on said generating winding means between said terminals, and a network including capacitative means and another voltage-generating winding means disposed upon a different one of said poles spaced substantially 180 electrical degrees from said one pole and magnetically linked to said first voltage-generating means.

21. In a generator, a pair of output terminals, voltage-generating winding means for producing a voltage difference between said terminals, a connection to a point on said generating winding means between said terminals, and a network including another voltage-generating winding means and capacitative means connected between each of said terminals and said connection.

22. In a generator, a pair of output terminals, voltage-generating winding means for producing a voltage difference between said terminals, a connection to a point on said generating winding means between said terminals, and a network including another voltage-generating winding means and capacitative means connected in series with one another between each of said terminals and said connection.

23. In a generator, a core structure, a magnetic field structure proximate said core structure, said structures being mounted for relative rotational movement, a pair of output terminals, winding means on said core structure for producing a voltage difference between said terminals, and a unitary structure on said core and magnetically linked to said first winding means and serving conjointly as another voltage-generating winding means and as a capacitor.

24. In a generator, a pair of output terminals, a multiple pole magnetic structure, first voltage-generating winding means entirely occupying the winding space on one of said poles for producing a voltage difference between said terminals, and a resonant network including capacitative means and another voltage-generating winding means disposed upon and entirely occupying the winding space on a different one of said poles and at times magnetically linked to said voltage-generating winding means by means including said magnetic structure.

25. In a generator, a pair of output terminals, a multiple pole magnetic structure, first and second voltage-generating winding means disposed upon first and third ones of said poles for producing a voltage difference between said terminals, and a resonant network including capacitative means and another voltage-generating winding means disposed upon a second one of said poles intermediate said first and third poles and at times magnetically linked to said first voltage-generating winding means and at other times magnetically linked to said second voltage-generating winding means.

26. In a generator, a pair of output terminals, a multiple pole magnetic structure, first and second voltage-generating winding means respectively disposed upon first and third ones of said poles and entirely occupying the winding space on said poles for producing a voltage difference between said terminals, and a resonant network including capacitative means and another voltage-generating winding means disposed upon a second one of said poles intermediate said first and third poles and entirely occupying the winding space on said poles and at times magnetically linked to said first voltage-generating winding means and at other times magnetically linked to said second voltage-generating winding means.

27. In a generator, a pair of output terminals, a multiple pole magnetic structure, first voltage-generating winding means disposed on one of said poles, field means movable relative to said magnetic structure for periodically inducing a flux in said magnetic structure including one of said poles, said first winding means tending to produce a quadrature lagging demagnetizing flux in said one of said poles, and means comprising capacitative means and a second voltage-generating winding means disposed on said magnetic structure and at least at times coupled to a magnetic circuit including said one of said poles and shock excited by said field means for at times inducing a flux in said one pole leading the flux induced in said one pole by said field means.

28. In a generator, a pair of output terminals, a multiple pole magnetic structure, first voltage-generating winding means disposed on one of said poles, field means movable relative to said magnetic structure for periodically inducing a flux in said magnetic structure including said one one of said poles, said first winding means tending to produce a quadrature lagging demagnetizing flux in said one of said poles, and means comprising capacitative means and a second voltage-generating winding means disposed on said magnetic structure and at least at times coupled to a magnetic circuit including said one of said poles and shock excited by said field means for at times inducing a flux in said one pole leading the flux induced in said one pole by said field means and including a component of substantial magnitude in phase with the flux induced in said pole by said field means and a smaller magnitude component in leading quadrature therewith for counteracting said demagnetizing flux.

29. The combination according to claim 1, said first and said other winding means being at least partly in non-overlapping relation.

30. The combination according to claim 1, said other voltage-generating winding means being disposed on a different pole than said one pole carrying said first voltage-generating winding means.

31. The combination according to claim 1, said generator being operable over a range of speeds including speeds above and below a predetermined speed, said resonant network being resonant at said predetermined speed and being operable to increase the electrical energy output of said first voltage-generating winding means entirely throughout said range of speeds.

32. The combination according to claim 1, the output voltages of all of said first voltage-generating winding means being in phase with one another.

33. The combination according to claim 25, said other voltage-generating winding means entirely occupying the winding space on said second pole.

References Cited in the file of this patent

UNITED STATES PATENTS 917,181     Steinmetz _______________ Apr. 6, 1909

UNITED STATES PATENT OFFICE
CERTIFICATION OF CORRECTION

Patent No. 3,009,092                          November 14, 1961

Thomas F. Carmichael

It is hereby certified that error appears in the above numbered patent requiring correction and that the said Letters Patent should read as corrected below.

Column 5, line 68, for "thtrough" read -- through --; column 17, line 44, after "including" insert -- said --.

Signed and sealed this 3rd day of April 1962.

(SEAL)
Attest:

ERNEST W. SWIDER
Attesting Officer

DAVID L. LADD
Commissioner of Patents